United States Patent [19]
Nagano et al.

[11] Patent Number: 5,610,681
[45] Date of Patent: Mar. 11, 1997

[54] OPTICAL EYE-CONTROL APPARATUS

[75] Inventors: Akihiko Nagano, Ichihara; Akira Yamada; Yoshiaki Irie, both of Yokohama, all of Japan

[73] Assignee: Canon Kabushiki Kaisha, Tokyo, Japan

[21] Appl. No.: 692,639

[22] Filed: Aug. 5, 1996

Related U.S. Application Data

[63] Continuation of Ser. No. 248,540, May 24, 1994, abandoned, which is a continuation of Ser. No. 141,614, Oct. 27, 1993, abandoned.

[30] Foreign Application Priority Data

Oct. 31, 1992 [JP] Japan ................................ 4-315834

[51] Int. Cl.⁶ .................................................. G03B 13/02
[52] U.S. Cl. .................................................. 396/51
[58] Field of Search ........................ 354/410, 62, 219; 351/210; 348/78

[56] References Cited

U.S. PATENT DOCUMENTS

| | | | |
|---|---|---|---|
| 4,559,446 | 12/1985 | Suzuki | 354/408 X |
| 5,109,154 | 4/1992 | Higashihara et al. | 354/407 X |
| 5,225,862 | 7/1993 | Nagano et al. | 354/410 X |
| 5,327,191 | 7/1994 | Shindo et al. | 354/410 X |
| 5,486,892 | 1/1996 | Suzuki et al. | 354/402 |

FOREIGN PATENT DOCUMENTS

| | | |
|---|---|---|
| 59-107311 | 6/1984 | Japan. |
| 59-107313 | 6/1984 | Japan. |
| 63-70297 | 3/1988 | Japan. |
| 63-108808 | 4/1988 | Japan. |
| 1-64630 | 3/1989 | Japan. |
| 63-105298 | 4/1989 | Japan. |
| 1-241511 | 9/1989 | Japan. |
| 1-274736 | 11/1989 | Japan. |

*Primary Examiner*—W. B. Perkey
*Attorney, Agent, or Firm*—Fitzpatrick, Cella, Harper & Scinto

[57] ABSTRACT

An apparatus having an irradiation device for irradiating the eye of an observer; a sensor having a number of pixels with a set pitch; an image forming optical unit for imaging light reflected by the eye onto the sensor; and an electronic circuit for making a signal denoting the direction of the line of sight of the eye in accordance with an output from the sensor, wherein the relationship expressed by Pitch $X/\beta < 0.41$ mm is satisfied when an assumption is made that the image forming magnification of the image forming unit is $\beta$ and the pitch of the pixels of the sensor is Pitch X so that accuracy in detecting the line of sight of the eye is improved.

14 Claims, 4 Drawing Sheets

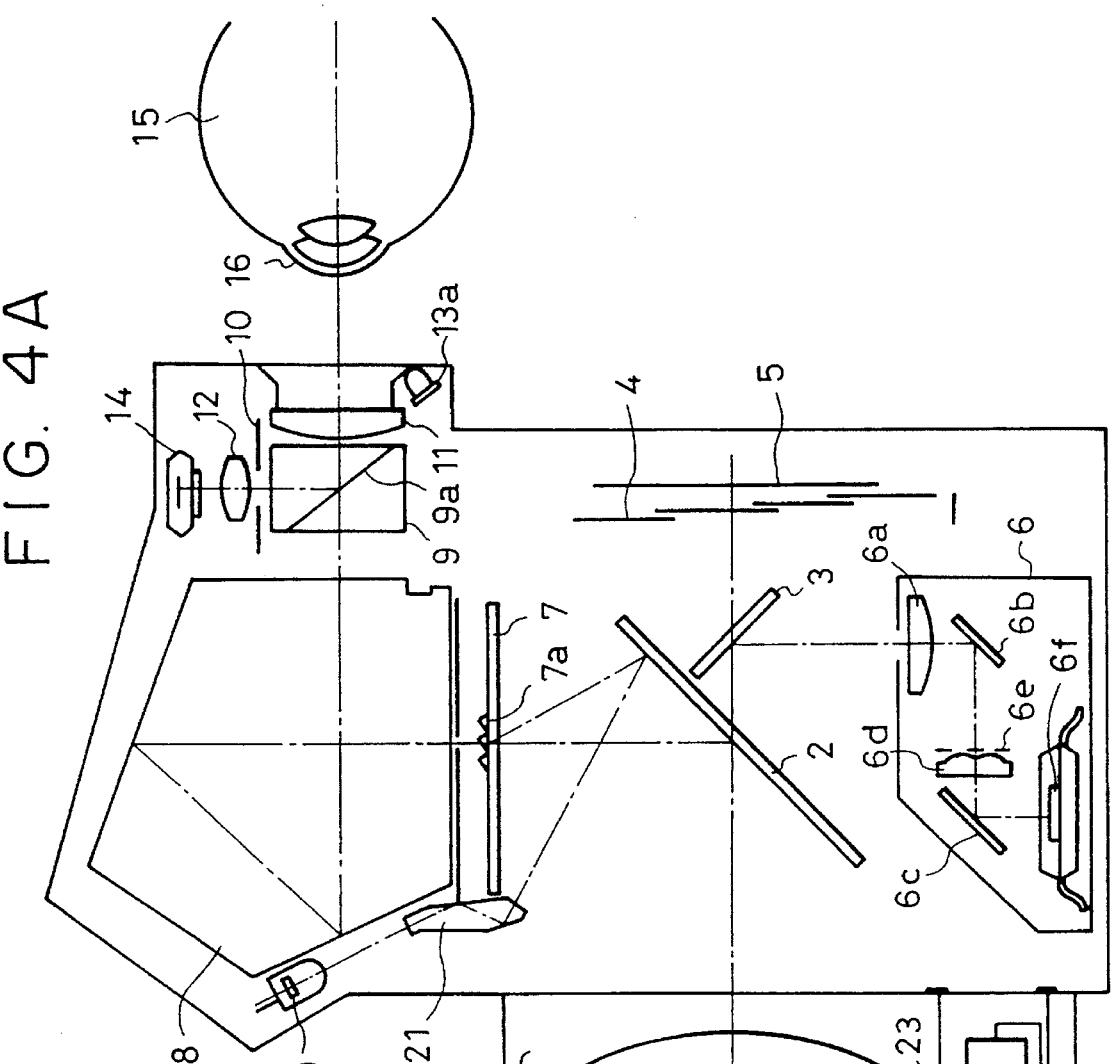
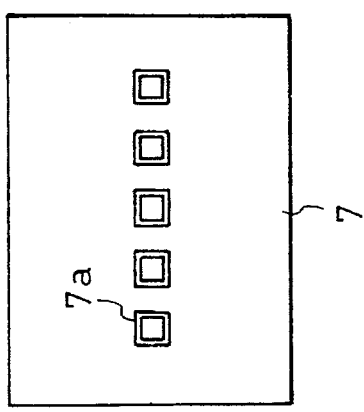

OPTICAL EYE-CONTROL APPARATUS

This application is a continuation of application No. 08/248,540 filed May 24, 1994, which is a continuation of application No. 08/141,614 filed Oct. 27, 1993, both now abandoned.

BACKGROUND OF THE INVENTION

1. Field of the Invention

The present invention relates to an apparatus for detecting the line of sight of the eye and an optical apparatus having the same, and more particularly to an apparatus for detecting the line of sight of the eye and an optical apparatus having the same that detects the axis of a looking direction of an observer, that is, the so called line of sight of the eye (the visual line), by making use of an image reflected from the eyeball obtained by illuminating the surface of the eyeball of the observer with light to perform a variety of photographing operations.

2. Related Background Art

Hitherto, a variety of apparatuses (for example, an eye camera) for detecting the position on the observed surface observed by an observer, that is, detecting the line of sight of the eye (the visual line) have been disclosed.

For example, Japanese Patent Application Laid-Open No. 1-274736 discloses a technology arranged in such a manner that parallel light beams emitted from a light source are used to irradiate the front portion of the eyeball of an observer, and a cornea reflection image formed by light reflected by the cornea and the imaging position of the pupil are utilized to obtain the visual line.

The position in the visual field of the finder which is observed by an observer can be obtained by detecting the rotational angle of the eyeball of the observer. The accuracy of detecting the rotational angle depends upon the image forming magnification of an optical system for detecting the line of sight of the eye.

If the image forming magnification of the optical system for detecting the line of sight of the eye is reduced, the quantity of movement of the eyeball image formed on the surface of an area-type sensor with respect to the rotation of the eyeball is made smaller. Therefore, the quantity of the change between the image of the light source reflected by the cornea and the center of the pupil becomes small. In this case, the accuracy in detecting the line of sight of the eye deteriorates.

Although the accuracy in detecting the line of sight of the eye can be improved by enlarging the image forming magnification of the optical system for detecting the line of sight of the eye, the area of the light receiving portion of the area-type sensor is enlarged excessively. In this case, a problem arises in manufacturing the apparatus and another problem of excessively large cost takes place.

If the pitch of pixels of the sensor is lengthened, the quantity of movement of the image of the eyeball formed on the surface of the sensor with respect to the rotation of the eyeball is made smaller. In this case, the accuracy in detecting the line of sight of the eye deteriorates.

Although the accuracy in detecting the line of sight of the eye can be improved by shortening the pitch of the pixels of the sensor, the number of pixels to be subjected to a calculation process is increased. Therefore, time taken to complete the detection of the line of sight of the eye becomes longer and a problem in practical use arises.

Further, the cost of the sensor cannot be reduced and the S/N ratio can easily be lowered because the light receiving area for one pixel is reduced.

Since the finder system of a camera has a wide horizontal directional visual field and the line of sight of the eye of an observer can easily be moved horizontally if the camera is held at a conventional attitude, the apparatus for detecting the line of sight of the eye must have an improved accuracy in detecting the line of sight of the eye in the horizontal direction. However, conventional apparatuses for detecting the line of sight of the eye have not been designed from the foregoing viewpoint.

SUMMARY OF THE INVENTION

An object of the present invention is to enable the line of sight of the eye to be detected accurately by adequately determining the image forming magnification of an optical system for detecting the line of sight of the eye and the pitch of pixels of an area-type sensor for detecting the line of sight of the eye of an observer.

Another object of the present invention is to detect accurately the line of sight of the eye by adequately determining the shape and the area of an aperture of the ocular lens through which an observer observes a finder system and the pitch of pixels and the dimension of an area-type sensor and to perform a variety of eye controlling operations of the apparatus.

Other and further objects, features and advantages of the invention will be appear more fully from the following description.

BRIEF DESCRIPTION OF THE DRAWINGS

FIG. 4A is a vertical cross sectional view which illustrates a single reflex lens camera employing an apparatus for detecting the line of sight of the eye;

FIG. 4B is a front elevational view which illustrates a focusing screen;

DETAILED DESCRIPTION OF THE PREFERRED EMBODIMENTS

Figure 1:
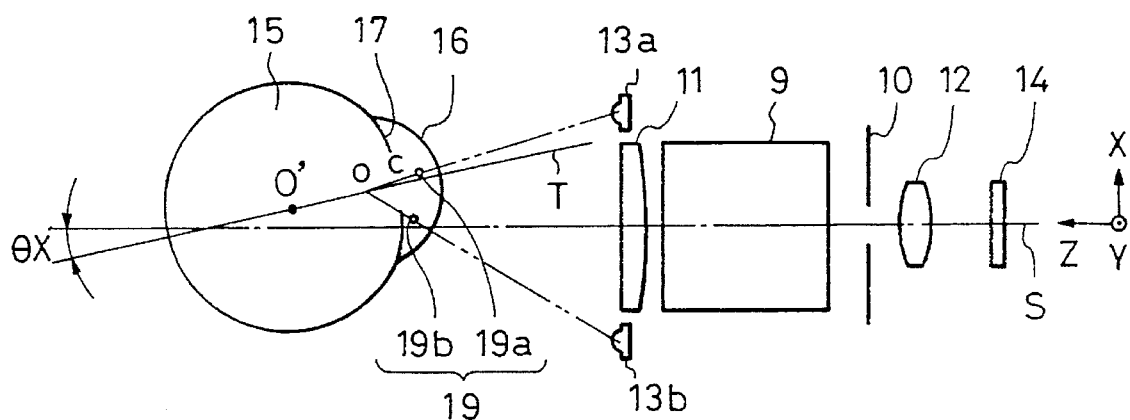
FIG. 1 is an extraction view which illustrates an optical system according to an embodiment of the present invention.

FIG. 4A is a cross sectional view which illustrates a single lens reflex camera having an eye detection apparatus.

Referring to FIGS. 4A and 4B, reference numeral 1 represents a photographing lens, and 2 represents a main mirror diagonally disposed in a photographing optical passage or removed from the same in accordance with a state where the image of an object is observed through a finder system and a state where an object is photographed. Reference numeral 3 represents a sub-mirror for reflecting light beams passed through the main mirror 2 to a focus detection device 6 disposed in a lower portion of a camera body as described later. Reference numeral 4 represents a shutter, and 5 represents a photosensitive member comprising a silver holoid film or a CCD or MOS solid-state image sensing device or an image-pick up tube such as a video converter.

Reference numeral 6 represents a focus detection device comprising a field lens 6a disposed adjacent to an image forming surface, reflecting mirrors 6b and 6c, a second imaging lens 6d, a double aperture plate 6e and a line sensor 6f composed of a plurality of CCDs.

The focus detection device 6 is adapted to a phase difference method disclosed in, for example, Japanese Patent Laid-Open No. 59-107311 and Japanese Patent Laid-Open No. 59-107313 so that a plurality of regions in an observed image plane (in a visual field of a finder) are made to be range finding points and the focal points of the range finding points can be detected as performed in a structure disclosed in U.S. Pat. Ser. No. 5,109,154.

Reference numeral 7 represents a focusing screen disposed at a predicted imaging surface of the photographing lens 1, and 8 represents a pentagonal roof prism for deflecting the finder optical passage.

A beam splitter 9 having a dichroic mirror 9a and an ocular lens 11 are disposed behind the emission surface of the pentagonal roof prism 8 to be used by a photographer 15 to observe the focusing screen 7. The dichroic mirror surface 9a permits, for example, visible rays and reflects infrared rays.

Reference numeral 10 represents a diaphragm, 12 represents a converging lens, and 14 represents an image sensor having photoelectric devices in a two dimensional manner, the image sensor 14 being disposed to be conjugate with the pupil (the iris) of the photographer 15 at a predetermined position with respect to the converging lens 12. Reference numerals 13a and 13b (omitted from illustration) represent infrared-ray emission diodes respectively serving as illumination light sources, the infrared-ray emission diodes 13a and 13b being disposed around the ocular lens 11.

Reference numeral 20 represents a superimposing LED so having high brightness that the LED 20 can be visually recognized even if a bright object is observed. Light emitted from the LED 20 is passed through a light projection prism 21, reflected by the main mirror 2, bent perpendicularly by a small prism array 7a disposed in a display portion of the focusing screen 7, and passed through the pentagonal roof prism 8, the beam splitter 9 and the ocular lens 11 to reach the eye 15 of the photographer 15.

The small prism array 7a is box-shaped and formed at each of a plurality of positions (at each range finding position) corresponding to the focus detection regions of the focusing screen (see FIG. 4B) so as to be irradiated with light supplied from any one of selected superimposing LEDs 20 disposed to correspond to the small prism arrays 7a. As a result, the small prism array 7a is lit in the visual field of the finder to indicate the focal-position detection region (range finding position).

Reference numeral 22 represents a diaphragm disposed in the photographing lens 1, 23 represents a drive unit including a diaphragm drive circuit, and 106 represents a focus adjustment circuit for controlling the lens drive members, such as the lens drive motor 24 and a drive gear 26. The focus adjustment circuit 106 rotates the lens drive motor 24 by a predetermined angular degree in accordance with information about the lens drive quantity supplied from the camera body portion so as to move the photographing lens to the focused position.

Figure 5A:
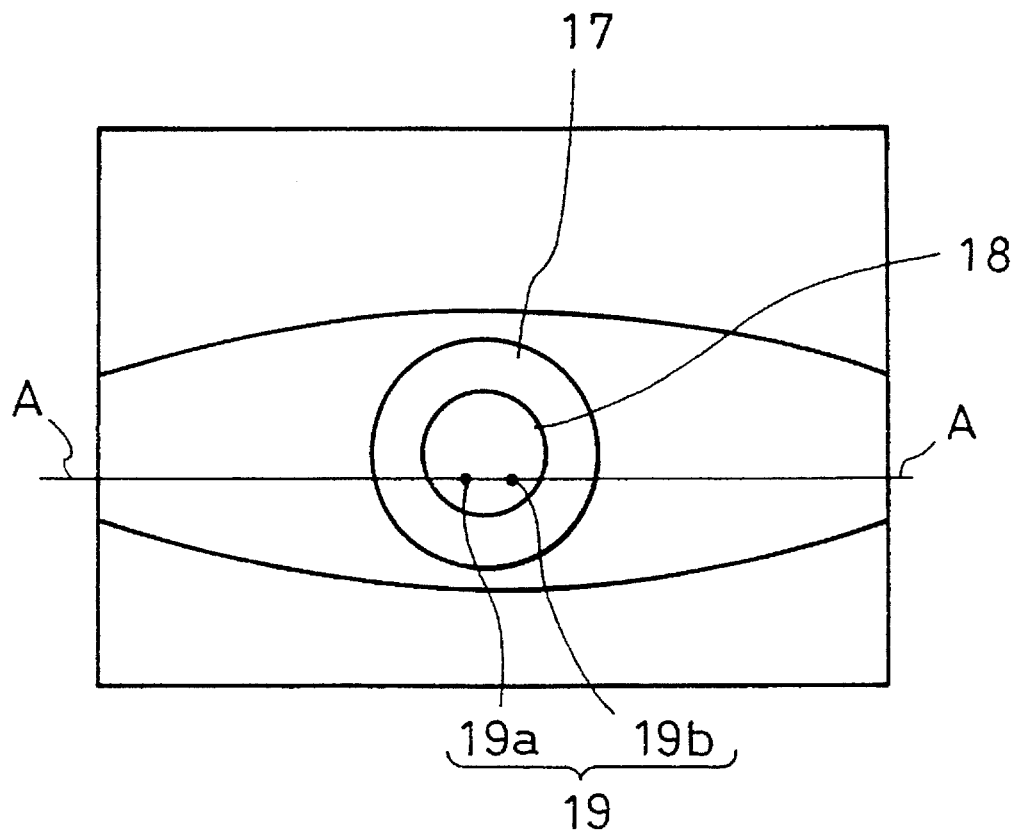
FIG. 5A is a view which illustrates a front eye portion image received by a CCD.
Figure 5B:
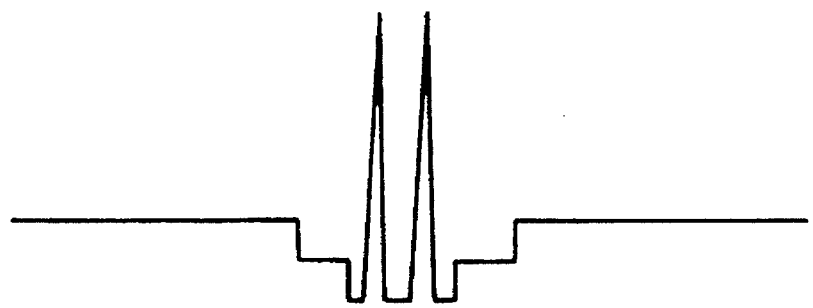
FIG. 5B is a graph showing an output signal from line A—A of FIG. 5.

FIG. 5A is a view which illustrates the image of the eyeball projected to the CCD 14 shown in FIG. 4, and FIG. 5B is a graph showing the intensities of outputs from the CCD 14 on line A—A.

Referring to FIG. 5A, reference numeral 16 (shown in FIG. 4A) represents a cornea, 17 represents an iris, 18 represents a pupil, and 19 (19a and 19b) represents an image of a light source reflected by the cornea 16 (hereinafter called a "cornea reflection image). When the eye 15 of the observer is irradiated with light emitted from the infrared-ray light emission diodes 13a and 13b, a portion of the infrared rays, in a mirror reflection manner, reflected from the cornea surface of the eyeball of the observer, forms a pair of cornea reflection images 19a and 19b having large light intensities on the CCD 14.

A portion of the infrared rays passed through the cornea 16 of the eye 15 of the observer is scatteringly reflected by the iris 17 so that the rest of light allowed to reach the retina after it has passed through the pupil 18 reflects little.

Therefore, the light intensity differs at the boundary between the iris 17 and the pupil 18. By detecting the boundary, the center of the pupil 18 is obtained by calculations.

The position in the finder visual field which is observed by the observed can be detected by detecting the rotational angle of the eyeball of the observer.

Although the rotational angle of the eyeball of the observer can be calculated in accordance with the distance from the midpoint of the two cornea reflection images 19a and 19b to the center of the pupil 18, the foregoing distance changes in accordance with the image forming magnification of the optical system for detecting the line of sight of the eye. Therefore, the detection accuracy of the rotational angle of the eyeball of the observer depends upon the image forming magnification of the optical system for detecting the line of sight of the eye.

In the foregoing specific example disclosed in Japanese Patent Application Laid-Open No. 1-274736, the image forming magnification of the optical system for detecting the line of sight of the eye is determined to be 1 or less.

Figure 3:
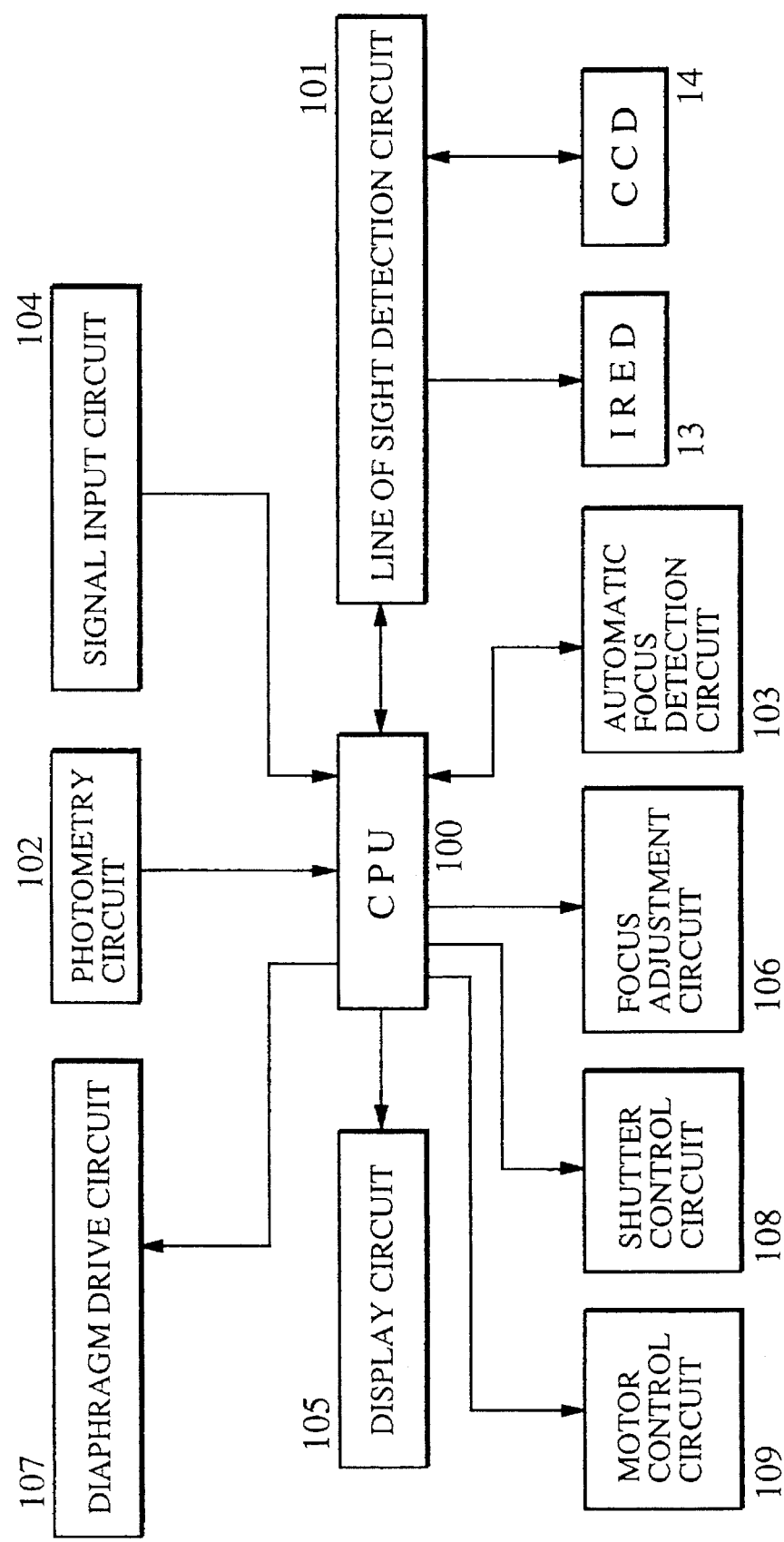
FIG. 3 is a block diagram which illustrates an electric system according to the embodiment of the present invention.

FIG. 3 illustrates a control system employed in a case where the apparatus for detecting the line of sight of the eye according to the present invention is adapted to a single lens reflex camera. The structure of the optical system is arranged as shown in FIG. 1. In FIGS. 1 and 3, the same elements as those shown in FIG. 4 are given the same reference numerals.

In this embodiment, when an observer who observes the finder system of the camera depresses the forward stage of a shutter release switch (omitted from illustration) while looking at the object, the signal input circuit 104 detects the depressing operation and transmits an input signal denoting this to a CPU 100 which serves as a calculating means. The CPU 100, which has detected the operation of depressing the forward stage of the shutter release switch, issues a command to perform detection of the line of sight of the eye to a circuit 101 for detecting the line of sight of the eye.

The circuit 101 for detecting the line of sight of the eye lights on the infrared ray emission diodes (hereinafter called an "iRED") 13a and 13b to irradiate the eyeball 15 of the observer. In synchronization with the irradiation duration of the iRED 13a and 13b, the CCD 14 stores the images.

When the observer's eye 15 shown in FIG. 1 is irradiated with the iREDs 13a and 13b, a portion of the infrared rays is reflected from the surface of the cornea 16. The cornea reflection images 19a and 19b formed due to this sequentially are sequentially passed through the ocular lens 11, the beam splitter 9 and the diaphragm 10, and then the cornea reflection images 19a and 19b are formed on the light receiving surface of the CCD 14 by the converging lens 12. The cornea reflection images 19a and 19b are virtual images of iREDs 13a and 13b generated due to the reflection with the cornea 16.

The infrared rays passed through the cornea 16 are reflected by the iris 17. The image relating to the iris is passed through the ocular lens 11, the beam splitter 9 and the diaphragm 10, and then it is formed on the light receiving surface of the CCD 14 by the converging lens 12.

Although the infrared rays passed through the pupil reach the retina, the major portion of the infrared rays passed through the pupil is not returned to the CCD 14 because the reflection with the retina is restricted. It should be noted that symbol S represents the optical axis of the optical system for detecting the line of sight of the eye, and T represents the optical axis of the eyeball.

The converging lens 12 of the optical system for detecting the line of sight of the eye is, as usual manner, set in such a manner that the iris 17 of the observer 15 and the light receiving surface of the CCD 14 are substantially conjugate with each other when the observer's eye 15 is at predetermined position (generally, at the position of the pupil of the finder system) with respect to the ocular lens 11.

The observer's eye 15 which looks into the finder system of the camera is able to move in direction X-Y-Z with respect to the ocular lens 11. If it is considerably deviated from the pupil position in the finder system, the image in the visual field of the finder is eclipsed. Therefore, the shift of the observer's eye 15 with respect to the optical axis (axis Z) of the ocular lens 11 is limited.

Figure 2:
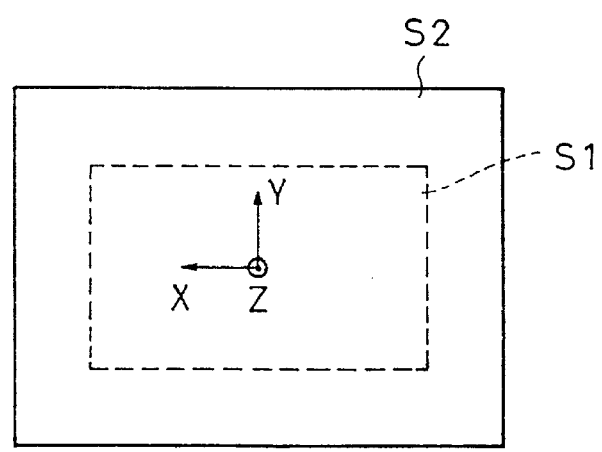
FIG. 2 is a front elevational view which illustrates an ocular portion of a finder.

Therefore, the movable range for the observer's eye 15 is concentrated in a range S1 designated with a dashed line with respect to an effective light beam region (in a region surrounded by a continuous line; that is, area S2) of the ocular lens 11 as shown in FIG. 2, the foregoing range S1 corresponding to substantially half of the overall area.

Accordingly, this embodiment is arranged in such a manner that the image forming magnification of the optical system and the area of the light receiving portion of the CCD 14 are determined to cause the optical system for detecting the line of sight of the eye to meet the following relationship assuming that the projection area of the light receiving portion of the CCD 14 on the ejection surface of the ocular lens 11:

$$0.5 \leq S1/S2 \leq 1 \tag{1}$$

Since the light receiving portion of the CCD 14 and the ejection surface of the ocular lens are deviated from the conjugated relationship, it cannot be said that a correct projection is realized. However, the portion inside a frame formed by connecting points through which marginal main beams pass through the ejection surface is considered to be the projection area when an assumption is made that the light beam is projected from the light receiving portion.

As a result, the image of the observer's eye is adequately imaged in the light receiving portion of the CCD 14. After a predetermined quantity of the eyeball images has been stored in the CCD 14, the circuit 101 for detecting the line of sight of the eye amplifies the image signal transmitted from the CCD 14 and transmits the amplified result to the CPU 100.

The CPU 100 converts the signal denoting the eyeball image from an analog signal to a digital signal and extracts the characteristics of the eyeball image in accordance with a predetermined algorithm. After the positions of the cornea reflection images 19a and 19b and the position of the center C of the pupil have been obtained by the sequential calculations, the rotational angle θ of the observer's eye 15 is calculated in accordance with an equation to be described later.

Further, the rotational angle θ of the observer's eye 15 is used to calculate the observation position of the observer in the finder.

In order to perform the detection of the focal point of the photographing lens 1 in the focus detection region adjacent to the calculated observation position of the observer in the finder system, the CPU 100 transmits a focus detection commencement signal to an automatic focus detection circuit 103. The automatic focus detection circuit 103 transmits to the CPU 100 an object signal of a predetermined focus detection region obtained from the focus detection device 6.

The CPU 100 calculates the focus adjustment state in the focus detection region adjacent to the observation position of the observer in the finder system, and transmits signals denoting the focus adjustment quantity and the direction for focusing the photographing lens 1 to the focus adjustment circuit 106. The focus adjustment circuit 106 transmits a drive signal to the drive motor 24 for driving the photographing lens 1 to move the photographing lens 1 to the focus position.

If a discrimination has been made by the CPU 100 that the photographing lens 1 has been focused, the CPU 100 transmits a focus display signal to a display circuit 105 so that the display circuit 105 displays the focus state. The display of the focus is performed by lighting on the superimposing LED 20.

When the observer has recognized that the photographing lens 1 has been focused to the object observed by the observer and has depressed the shutter release switch (omitted from illustration) to perform a photographing operation, the signal input circuit 104 transmits a release signal to the CPU 100.

The CPU 100 receives photometry information from a photometry circuit 102 to determine the exposure value. The CPU 100 transmits the diaphragm value determined by a diaphragm drive circuit 107 and also transmits information about the shutter speed to a shutter control circuit 108. When the main mirror 2 and the sub-mirror 3 have been removed from the photographing optical passage, the shutter 4 is opened so that the film 5 is exposed to light.

After the shutter 4 has been closed to complete the exposure of the film 5 to light, the CPU 100 transmits a film winding-up signal to a motor control circuit 109 to wind up the film 5.

When the CPU 100 serving as the circuit for calculating the line of sight of the eye has obtained the positions of the cornea reflection images 19a and 19b and the position of the center C of the pupil, the CPU 100 calculates the rotational angle θ of the observer's eye 15.

Assuming that the X-directional positions of a pair of the cornea reflection images 19a and 19b on the surface of the CCD 14 are XIa and XIb and the position of the center C of the pupil is XC, the X-directional rotational angle θX of the observer's eye with respect to axis Z meets the following equation:

$$\beta \cdot OC \cdot \text{SIN}\,\theta X = \left( XC - \frac{XIa + XIb}{2} \right) \cdot \text{Pitch}\,X \tag{2}$$

where β is an integer denoting the image forming magnification of the optical system for detecting the line of sight of the eye, OC is the distance from the curvature center O of the cornea 16 to the center C of the pupil, and Pitch X is the X-directional pixel pitch of the CCD 14.

When Equation (2) is arranged by differentiating it about δ while assuming that the distance from the center C of the pupil and the midpoint between the cornea reflection images 19a and 19b is δ, the following equation can be obtained:

$$\frac{d\theta X}{d\delta} = \frac{\text{Pitch } X}{\beta} \cdot \frac{1}{OC \cdot \cos \theta X} \quad (3)$$

In the case of a single reflex lens camera, it is preferable that an accuracy in detecting the line of sight of the eye be realized with which a finder image plane can be divided into 5 or more sections in the horizontal direction (in direction X). The finder system of a single reflex lens camera usually has a horizontal visual field of about 30°. Therefore, the accuracy in detecting the line of sight of the eye must be smaller than about 0.11 radian.

Assuming that resolving power of the distance δ from the center C of the pupil to the cornea reflection images 19a and 19b is 1 pixel, the following relationship must be held:

$$d\theta X/d\delta < 0.11 \quad (4)$$

Assuming that OC is 4.1 mm and θX is 0 radian, the following relationship is held from Equations (3) and (4):

$$\text{Pitch } X/\beta < 0.41 \text{ mm} \quad (5)$$

That is, an excellent accuracy can be realized if Equation (5) is met.

If the pitch of the pixels of the sensor is shortened to meet Equation (5), the cost required to manufacture a sensor is enlarged, the light receiving area per pixel is reduced, and the S/N ratio is undesirably reduced, causing a problem in terms of practical use to take place. Therefore, it is preferable that the pitch of the pixels of the sensor satisfies the following relationship:

$$\text{Pitch } X > 0.005 \text{ mm} \quad (6)$$

In order to meet Equation (5), the image forming magnification β of the optical system for detecting the line of sight of the eye must be enlarged. However, it is preferable that the image forming magnification β of the optical system for detecting the line of sight of the eye of a small machine, such as the camera, meets the following relationship:

$$\beta \leq 0.5 \quad (7)$$

By meeting the following relationship between the image forming magnification β of the optical system for detecting the line of sight of the eye and the pixel pitch P of an area-type sensor in accordance with Equations (5), (6) and (7), precise detection of line of sight of the eye can be performed:

$$0.01 < \text{Pitch } X/\beta \text{ mm} \quad (8)$$

Assuming that the X-directional pitch of the pixels of the CCD 14 is expressed by Pitch=0.02 mm, it is necessary for the magnification β of the optical system for detecting the line of sight of the eye to meet the following relationships:

$$0.5 \geq \beta \geq 0.049$$

If the image forming magnification β of the optical system for detecting the line of sight of the eye has been determined when the observer 15 is at a predetermined position from the ocular lens 11, also the imaging magnification βO on the ejection surface of the ocular lens 11 is determined.

From Equation (1), the area SO of the light receiving portion of the CCD 14 must meet the following relationship:

$$0.5 \leq \frac{SO}{\beta O \cdot \beta O \cdot S2} \leq 1 \quad (9)$$

Although the description has been made in this embodiment by using the X-directional accuracy in detecting the line of sight of the eye, the Y-directional accuracy in detecting the line of sight of the eye may be calculated similarly. Since the Y-directional accuracy in detecting the line of sight of the eye is allowed to be lower than the X-directional accuracy in detecting the line of sight of the eye, the Y-directional pitch of the pixels of the CCD 14 may be Pitch Y=0.03 mm. As a result, the accuracy in detecting the line of sight of the eye in the direction Y is 0.67 times that in the direction X.

As described above, this embodiment is arranged in such a manner that the aperture (the visual field of the finder) in the finder system is formed into substantially a rectangular shape having a longer side in the direction X (the first direction) and a shorter side in the direction Y (the second direction) while making each pixel of the CCD 14 to be in substantially a rectangular shape having a shorter side (pitch P=0.02 mm) in the direction X and a longer side (pitch P=0.03 mm) in the direction Y. Although the direction is sometimes changed if a reflecting surface is interposed into the optical system, the foregoing arrangement is defined in a state where the optical system is developed.

If setting is made in such a manner that the imaging magnification β of the optical system for detecting the line of sight of the eye in a state where the observer's eye 15 is distant from the ocular lens by a distance of 20 mm holds a relationship β=0.09, the image forming magnification βO at the ejection surface of the ocular lens 11 is about 0.14.

If the ejection surface of the ocular lens is made to be as follows:

$$S2 = 16 \times 10 \text{ mm}^2,$$

the area SO of the light receiving portion of the CCD 14 must meet the following relationship from Equation (9):

$$1.57 \leq SO \leq 3.14 \text{ mm}^2 \quad (10)$$

If the area of the light receiving portion of the CCD 14 is made to be as follows:

$$SO = 1.6 \times 1 \text{ mm}^2$$

The eyeball image can be detected with the number of pixels expressed by 80×33.

Although the structure shown in FIG. 2 is arranged in such a manner that the movable range for the observer's eye 15 is designated by the region S1 (within the dashed line) formed by equally narrowing the four directions of the effective light beam region S2 of the ocular lens 11, a design of an ocular frame (omitted from illustration) so made that the observer's eye 15 cannot easily be moved in the vertical direction with respect to the optical axis S of the finder enables the vertical movable range of the observer's eye to be limited.

Although the description of this embodiment is made about the optical system for detecting the line of sight of the eye provided for the single reflex lens camera, the present invention may also be adapted to a video camera having an electronic finder. If an accuracy in detecting the line of sight of the eye is required with which regions obtained by horizontally dividing an image plane (horizontal visual field is about 18°) into three or more sections, the optical system for detecting the line of sight of the eye may be structured to meet the relationship expressed by Equation (4).

According to the present invention, the image forming magnification of the optical system for detecting the line of sight of the eye and the pitch of the pixels of the area-type sensor are determined adequately so that an apparatus for detecting the line of sight of the eye capable of precisely detecting the line of sight of the eye can be provided.

Further, the shape and the area of the aperture of the ocular lens of the finder system through which the observer observes the image and the pitch and the dimensions of the pixels of the area-type sensor are adequately determined so that an optical apparatus having an apparatus for detecting the line of sight of the eye capable of precisely detecting the line of sight of the eye and enabling a variety of photographing operations to be performed can be realized.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus comprising:

a viewfinder having an ocular lens; irradiation means for irradiating the eye of an observer;

an area type sensing means having a plurality of pixels arranged in a two-dimensional manner and having a set pitch in a sensing direction;

converging optical means for converging light reflected by the eye onto said sensing means, said converging optical means having an image forming magnification; and means for making a signal denoting the direction of the line of sight of the eye in accordance with an output from said sensing means, wherein assuming that an effective area of an ejection surface of said ocular lens is S2 and a projection area realized when a light receiving region of said sensing means is projected onto the ejection surface is S1, the following relationship is satisfied:

$$0.5 \leq S1/S2 \leq 1,$$

and assuming that the image forming magnification of an optical system including said ocular lens and said converging optical means is $\beta$ and the pitch of said pixels of said sensing means is Pitch X, the following relationship is satisfied:

$$\text{Pitch } X/\beta < 0.41 \text{ mm}.$$

2. An apparatus according to claim 1 further satisfying the following relationship:

$$0.01 \text{ mm} < \text{Pitch } X/\beta.$$

3. An apparatus according to claim 1, wherein said sensing means comprises an area-type sensing means in which said pixels are disposed in a two-dimensional manner.

4. An apparatus according to claim 1, wherein said irradiation means comprises a plurality of light sources that directly irradiates the eye with diffused light emitted by said plurality of light sources.

5. An apparatus according to claim 1, wherein said sensing means comprises an area-type sensing means in which said pixels are disposed in a two-dimensional manner, an opening of said viewfinder being formed into substantially a rectangular shape having a relatively long side in a first direction and a relatively short side in a second direction, and a light receiving region of a pixel of said sensing means being formed into a substantially rectangular shape having a relatively short side in the first direction and a relatively long side in the second direction.

6. An apparatus comprising:

a finder for observing an object, said finder including an ocular lens element;

irradiation means for irradiating an eye viewing said finder;

sensing means having a plurality of pixels in a light receiving region;

image forming optical means for causing light reflected by the eye and passed through said ocular lens element to be imaged onto said light receiving region of said sensing means resulting in an output of said sensing means; and means for making a signal denoting a direction of the line of sight of the eye in accordance with the output from said sensing means, wherein assuming that an effective area of an ejection surface of said ocular lens element is S2 and a projection area realized when said light receiving region of said sensing means is projected onto said ejection surface of said ocular lens element is S1, the following relationship is satisfied:

$$0.5 \leq S1/S2 \leq 1.$$

7. An apparatus according to claim 6, wherein assuming that the image forming magnification of an optical system including said ocular lens element and said image forming optical means is $\beta$ and the pitch of said pixels of said sensing means is Pitch X, the following relationship is satisfied:

$$0.01 \text{ mm} < \text{Pitch } X/\beta < 0.41 \text{ mm}.$$

8. An apparatus according to claim 6, wherein an opening of said finder is formed into substantially a rectangular shape having a longer side in a first direction and a shorter side in a second direction, and a light receiving region of said sensing means is formed into substantially a rectangular shape having a relatively shorter side in the first direction and a relatively longer side in the second direction.

9. A camera comprising:

a finder for observing an object, said finder including an ocular lens element;

irradiation means for irradiating an eye viewing said finder;

sensing means having pixels having a set pitch and being disposed in a two-dimensional manner in a light receiving region;

image forming optical means for causing light reflected by the eye and passed through said ocular lens element to be imaged onto said light receiving region of said sensing means resulting in an output of said sensing means; and control means for forming a signal denoting the direction of the line of sight of the eye in accordance with an output from said sensing means and controlling at least one function of said camera in response to the signal, wherein assuming that the image forming magnification of an optical system including said ocular lens element and said image forming optical means is β and the pitch of said pixels of said sensing means is Pitch X, the following relationship is satisfied:

0.01 mm<Pitch X/β<0.41 mm, and assuming that an effective area of an ejection surface of said ocular lens element is S2 and a projection area realized when the light receiving region of said sensing means is projected onto said ejection surface of said ocular lens element is S1, the following relationship is satisfied:

0.5≦S1/S2≦1.

10. A camera according to claim 9, wherein an opening of said finder is formed into substantially a rectangular shape having a longer side in a first direction and a shorter side in a second direction, and a light receiving region of said sensing means is formed into substantially a rectangular shape having a relatively shorter side in the first direction and a relatively longer side in the second direction.

11. A camera according to claim 9, wherein said function is a function of respectively and independently detecting focal points of a plurality of positions in a scene.

12. A camera, comprising:

a finder for observing an object, said finder including an ocular lens element;

irradiation means for irradiating an eye viewing said finder;

sensing means in a light receiving region;

image forming optical means for causing light reflected by the eye and passed through said ocular lens to be imaged onto said light receiving region of said sensing means resulting in an output of said sensing means; and means for making a signal denoting a direction of the line of sight of the eye in accordance with the output from said sensing means, wherein assuming that an effective area of an ejection surface of said ocular lens element is S2 and a projection area realized when a light receiving region of said sensing means is projected onto said ejection surface of said ocular lens element is S1, the following relationship is satisfied:

0.5≦S1/S2≦1, and wherein at least one function of said camera is controlled by a signal denoting the direction of the line of sight of the eye.

13. An optical apparatus, comprising:

an ocular lens for viewing an object;

an image sensor having a light receiving region;

an optical system for receiving light from an eye viewing said object and for forming an image of the eye on said light receiving region of the image sensor; and means for detecting a sight line direction of the eye in accordance with an output from said image sensor, wherein a projection area realized when the light receiving area of said image sensor is projected onto an ejection surface of said ocular lens is not larger than an effective area of the ejection surface of said ocular lens; and wherein, assuming that an effective area of the ejection surface of said ocular lens is S2 and said projection area realized when the light receiving area of said image sensor is projected onto the ejection surface of said ocular lens is S1, the following relationship is satisfied:

0.5≦S1/S2≦1.

14. An optical apparatus, comprising:

an ocular lens;

means for detecting an image of an eye;

means for receiving light from said eye through said ocular lens and for projecting the image of the eye onto a detection surface of said image detecting means; and means for detecting a sight line direction of the eye in accordance with the detection of the image of the eye by said image detecting means, wherein a size of an image formed when the detection surface of said image detecting means is projected onto an ejection surface of said ocular lens is not larger than that of an effective area of the ejection surface of said ocular lens; and wherein, assuming that an effective area of the ejection surface of said ocular lens is S2 and a projection area realized when the detection surface of said image detecting means is projected onto the ejection surface of said ocular lens is S1, the following relationship is satisfied:

0.5≦S1/S2≦1.

\* \* \* \* \*

UNITED STATES PATENT AND TRADEMARK OFFICE
CERTIFICATE OF CORRECTION

PATENT NO. : 5,610,681
DATED : March 11, 1997
INVENTOR(S) : AKIHIKO NAGANO, ET AL.

It is certified that error appears in the above-identified patent and that said Letters Patent is hereby corrected as shown below: Title page, <u>At [56] References Cited</u>

FOREIGN PATENT DOCUMENTS

"63-105298   4/1989   Japan" should read
--63-105298   4/1988   Japan--.

<u>COLUMN 3</u>

Line 39, "so" should be deleted.
Line 40, "that" should read --so that--.

<u>COLUMN 8</u>

Line 48, "¶The" should read --the--.

<u>COLUMN 9</u>

Line 26, "lens; irradiation" should read
--lens; ¶ irradiation--.
Line 65, "irradiates" should read --irradiate--.

Signed and Sealed this

Twenty-third Day of September, 1997

Attest:

BRUCE LEHMAN

Attesting Officer      Commissioner of Patents and Trademarks